United States Patent
She et al.

(10) Patent No.: US 10,721,945 B2
(45) Date of Patent: Jul. 28, 2020

(54) EDIBLE ANIMAL CHEWS AND METHODS OF MAKING AND USING SAME

(71) Applicant: NESTEC SA, Vevey (CH)

(72) Inventors: Manjuan Jenny She, Chesterfield, MO (US); Michael E. Leiweke, Hillsboro, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 335 days.

(21) Appl. No.: 15/229,677

(22) Filed: Aug. 5, 2016

(65) Prior Publication Data

US 2017/0042192 A1    Feb. 16, 2017

Related U.S. Application Data

(60) Provisional application No. 62/204,023, filed on Aug. 12, 2015.

(51) Int. Cl.
| | |
|---|---|
| *A23K 40/25* | (2016.01) |
| *A23K 10/30* | (2016.01) |
| *A23K 50/42* | (2016.01) |
| *A23K 20/158* | (2016.01) |
| *A23K 20/105* | (2016.01) |
| *A23K 20/163* | (2016.01) |
| *A23K 10/37* | (2016.01) |
| *A23K 20/147* | (2016.01) |

(Continued)

(52) U.S. Cl.
CPC .............. *A23K 40/25* (2016.05); *A23K 10/26* (2016.05); *A23K 10/30* (2016.05); *A23K 10/37* (2016.05); *A23K 20/105* (2016.05); *A23K 20/111* (2016.05); *A23K 20/147* (2016.05); *A23K 20/158* (2016.05); *A23K 20/163* (2016.05); *A23K 20/174* (2016.05); *A23K 50/42* (2016.05); *A23K 50/45* (2016.05); *Y02P 60/877* (2015.11)

(58) Field of Classification Search
CPC ........................................ A23K 40/25
See application file for complete search history.

(56) References Cited

U.S. PATENT DOCUMENTS

| | | | |
|---|---|---|---|
| 6,455,083 B1 * | 9/2002 | Wang ................... | A01K 15/026 426/104 |
| 2004/0197455 A1 * | 10/2004 | Nie ........................ | A23K 40/20 426/549 |

(Continued)

FOREIGN PATENT DOCUMENTS

| | | | | |
|---|---|---|---|---|
| CA | 2245993 A1 * | 2/2000 | ............. | A21C 11/16 |
| EP | 0552897 | 7/1993 | | |

(Continued)

OTHER PUBLICATIONS

Written Opinion of International Application No. PCT/IB2016/054754 dated Oct. 25, 2016.

(Continued)

*Primary Examiner* — Jenna A Watts

(57) ABSTRACT

Edible chews having a polygon-shaped cross-section, such as a star-shaped cross section. This cross-sectional shape provides an increased surface area and forms edges, and these features clean teeth of an animal such as a dog. These edible chews have a soft chewy texture which avoids or significantly reduces gum bleeding which is caused by known dental treats with typically have a hard texture.

18 Claims, 1 Drawing Sheet

(51) Int. Cl.
*A23K 20/174* (2016.01)
*A23K 10/26* (2016.01)
*A23K 20/111* (2016.01)
*A23K 50/45* (2016.01)

(56) References Cited

U.S. PATENT DOCUMENTS

2006/0193959 A1* 8/2006 Nie .................. A23K 40/20
                                                          426/549
2008/0003270 A1* 1/2008 Garcia Martinez .... A23K 40/20
                                                          424/442
2010/0034925 A1* 2/2010 Pibarot ................ A23K 40/20
                                                          426/61
2014/0295052 A1* 10/2014 Elliott ................ A01K 15/026
                                                          426/656

FOREIGN PATENT DOCUMENTS

| EP | 1800545 | 6/2007 |
| EP | 2123169 | 11/2009 |
| WO | 2005092087 | 10/2005 |
| WO | 2012156674 | 11/2012 |
| WO | 2013025183 | 2/2013 |

OTHER PUBLICATIONS

International Search Report for International Application No. PCT/IB2016/054754 dated Oct. 25, 2016.
Notification of International Search Report Form for International Application No. PCT/IB2016/054754 dated Oct. 25, 2016.
Mintel; May 2015 (May 2015) anonymous: "Star bar dog dental bars", XP002762922.
Mintel; Jul. 2010 (Jul. 2010), Anonymous: "Dental stick", XP002762923.
Mintel; Dec. 2012 (Dec. 2012), Anonymous: "Dental care sticks for dogs", XP002762924.
Mintel; Jan. 2014 (Jan. 2014) Anonymous: "Mint and parsley flavoured dental snacks", XP002762925.
Mintel; Nov. 2013 (Nov. 2013), Anonymous: "Chewing snack for dogs", XP002762926.

* cited by examiner

EDIBLE ANIMAL CHEWS AND METHODS OF MAKING AND USING SAME

CROSS-REFERENCE TO RELATED APPLICATIONS

This application claims priority to U.S. Provisional Application No. 62/204,023 filed Aug. 12, 2015, the disclosure of which is incorporated herein by this reference.

BACKGROUND

The present disclosure relates generally to edible compositions having a shape that provides an increased surface area and forms edges, and these features clean teeth of an animal. These edible compositions have a soft texture and high moisture.

Periodontal disease occurs five times more often in pets than in humans. For example, more than 80% of dogs over three years old have periodontal disease. In the wild, many animals eat foods that mechanically abrade plaque and calculus from the teeth. In contrast, pets are usually fed commercially available pet foods that may provide better nutritional value but do not generally subject the teeth to abrasive forces sufficient to clean the teeth. This is even true of dried kibbles, which are able to abrade the teeth only to a very limited extent. In part, this limited abrading is due to the dried kibbles crumbling when chewed by the pet.

Periodontal treatments are painful for dogs and a high cost for dog owners. Therefore, a dog needs dental care to prevent periodontal disease. However, most pet owners are reluctant or unable to provide the routine brushing necessary to maintain good oral health in their pets and would likely welcome an alternative provided by dietary means.

Various products are intended for improving pet dental health. Generally, animal chew toys are made from plastic or other material that cannot be eaten by the animal. Animals typically tire of non-edible animal chew toys after a short period of time and move on to other activities. Moreover, non-edible animal chew toys provide no nutritional value to the animal and are limited in providing a health benefit to the animal. Edible chews have been developed, but they have a complex product design and are sold at a high price as special treats.

SUMMARY

The present disclosure relates generally to edible chews having a polygon-shaped cross-section, such as a star-shaped cross section. This cross-sectional shape provides an increased surface area and forms edges, and these features clean teeth of an animal. These edible chews have a soft chewy texture which avoids or significantly reduces gum bleeding which is caused by known dental treats with typically have a hard texture.

Accordingly, in a general embodiment, the present disclosure provides an edible pet chew comprising an expanded pre-gelled cereal flour and a humectant, having a moisture content of 14% to 24%, and having a transversal cross section that has a star polygon shape.

In an embodiment, the chew is a single unitary piece that is substantially homogenous.

In an embodiment, the edible pet chew comprises a first end that has the star polygon shape, a second end that has the star polygon shape, and a length defined by the distance between the first end and the second end, wherein the transversal cross section is perpendicular to the length. The edible pet chew can have the star polygon shape along substantially the entirety of the length of the chew. The length is two to ten inches.

In an embodiment, the star polygon shape of the transversal cross section is a pentagram shape.

In an embodiment, the humectant is a polyol.

In an embodiment, the edible pet chew is an extruded product.

In an embodiment, the moisture content is 18% to 24%.

In another embodiment, the present disclosure provides a method of making an edible pet chew. The method comprises the steps of: preparing a dry mix comprising a pre-gelled cereal flour; metering the dry mix into an extruder comprising an extrusion die; adding a composition comprising a humectant to the dry mix to form a dough; subjecting the dough to a combination of shear and heat in the extruder; and directing the heated and sheared dough through an opening of the extrusion die comprising an opening that has a star polygon shape.

In an embodiment, the heated and sheared dough reaches a temperature of 230 to 300° F. The heated and sheared dough can be cooled to 190 to 250° F. after reaching the temperature of 230 to 300° F.

In an embodiment, the composition added to the dry mix comprises an amount of water such that the edible pet chew has a moisture content of 14% to 24%.

In an embodiment, the dry mix further comprises at least one component selected from the group consisting of a grain, a grain by-product, gelatin, a gum, an antioxidant, an emulsifier, an oil, a preservative, and a flavorant. The emulsifier can be selected from the group consisting of soy lecithin, monoglycerides, diglycerides, and combinations thereof. The preservative can be selected from the group consisting of potassium sorbate, sorbic acid, sodium methyl para-hydroxybenzoate, tricalcium phosphate, calcium propionate, propionic acid, and combinations thereof. The preservative can be selected from the group consisting of butylated hydroxyanisole (BHA), butylated hydroxytoluene (BHT), vitamin E, and combinations thereof. The flavorant can be selected from the group consisting of yeast, tallow, an animal meal, and an animal digest.

In another embodiment, the present disclosure provides a method of cleaning teeth of a pet. The method comprises administering to the pet an edible pet chew comprising an expanded pre-gelled cereal flour and a humectant, having a moisture content of 14% to 24%, and having a transversal cross section that has a star polygon shape.

In an embodiment, the pet is a dog.

An advantage of the present disclosure is to provide improved edible chews for pets.

Another advantage of the present disclosure is to provide improved methods of making edible chews for pets.

Still another advantage of the present disclosure is to provide an edible chew with a simple product design.

Yet another advantage of the present disclosure is to provide an edible chew with an affordable cost.

Another advantage of the present disclosure is to provide an edible pet chew that is easily manufactured.

Still another advantage of the present disclosure is to increase the surface area of an edible chew relative to known chews.

Yet another advantage of the present disclosure is to provide an edible chew with edges that help clean the teeth of the pet.

Still another advantage of the present disclosure is to provide an edible pet chew that has a soft chewy texture, which will significantly reduce gum bleeding caused by typical dental treats which have a hard texture.

Another advantage of the present disclosure is to provide an edible pet chew that is effective in cleaning back teeth of the pet.

Additional features and advantages are described herein, and will be apparent from the following Detailed Description and the Figures.

DETAILED DESCRIPTION

Figure 1:
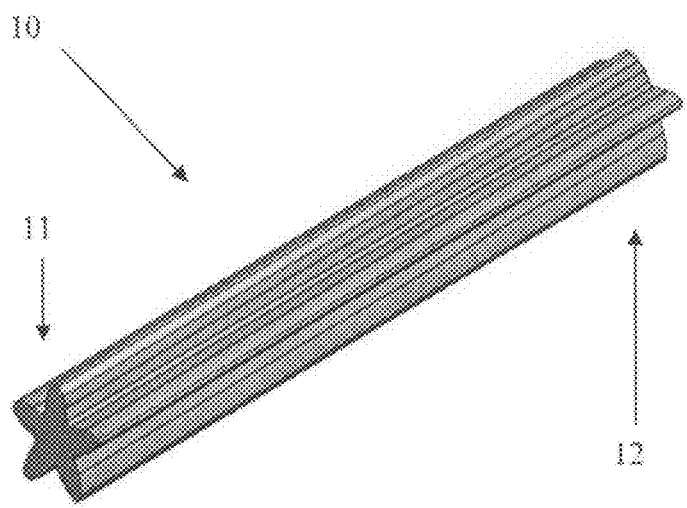
FIG. 1 is a side perspective view of an embodiment of an edible pet chew provided by the present disclosure.

As used in this disclosure and the appended claims, the singular forms "a," "an" and "the" include plural referents unless the context clearly dictates otherwise. Thus, for example, reference to "a chew" includes two or more chews. The term "and/or" used in the context of "X and/or Y" should be interpreted as "X," or "Y," or "X and Y."

All percentages expressed herein are by weight of the total weight of the edible chew unless expressed otherwise. As used herein, "about," "approximately" and "substantially" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

The terms "food," "food product" and "food composition" mean a product or composition that is intended for ingestion by an animal, including a human, and provides at least one nutrient to the animal. The term "pet food" and "pet treat" mean any food composition intended to be consumed by a pet. The term "edible chew" means a comestible product that requires a longer chewing time before the product can be ingested, relative to a standard comestible product. Preferably the edible chew requires at least one minute of chewing before the product can be ingested, for example one to four minutes of chewing before the product can be ingested.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. "Consisting essentially of" means that the embodiment comprises more than 50% of the identified components, preferably at least 75% of the identified components, more preferably at least 85% of the identified components, most preferably at least 95% of the identified components, for example at least 99% of the identified components.

Figure 2:
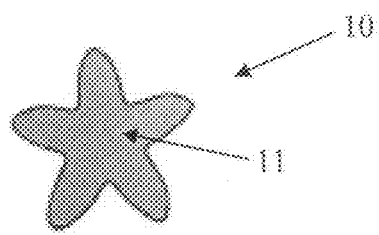
FIG. 2 is a front plan view of an embodiment of an edible pet chew provided by the present disclosure.
Figure 3:
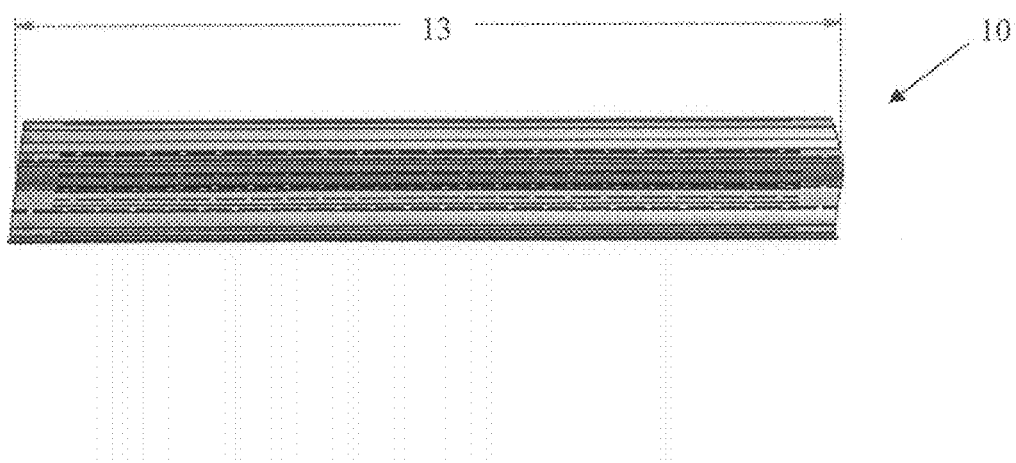
FIG. 3 is a side plan view of an embodiment of an edible pet chew provided by the present disclosure.

FIGS. 1-3 show an embodiment of an edible pet chew 10 that comprises an expanded pre-gelled cereal flour and a humectant, has a moisture content of 14% to 24%, and has a transversal cross section that has a star polygon shape. In an embodiment, the moisture content is 18% to 24%. Preferably, the edible pet chew 10 is a single unitary piece that is substantially homogenous.

A "star polygon" is a concave polygon that is substantially equilateral and substantially equiangular and preferably is a pentagram. The edible pet chew 10 can comprise a first end 11 that has the star polygon shape, a second end 12 that has the star polygon shape, and a length 13 defined by the distance between the first end 11 and the second end 12. The "transversal cross section" is any cross-section perpendicular to the length 13. Preferably the edible pet chew 10 has the star polygon shape through substantially the entirety of the length 13. The length 13 can be two to ten inches, such as about five inches.

In an embodiment, the pre-gelled cereal flour is 30 to 60% of the edible chew 10. Non-limiting examples of suitable pre-gelled cereal flours include pre-gelled rice flour, pre-gelled wheat flour, pre-gelled corn flour, pre-gelled barley flour, pre-gelled sorghum flour, pre-gelled millet flour, pre-gelled oat flour, pre-gelled rye flour, pre-gelled triticale flour and combinations thereof.

In an embodiment, the humectant is 10 to 17% of the edible chew 10. The humectant can be any compound that has humectant properties and is compatible with food compositions. In various embodiments, the humectant plasticizers are polyols. In preferred embodiments, the humectant is one or more of glycerol (glycerin), sorbitol, propylene glycol (e.g., monopropylene glycol), butylene glycol, polydextrose, or combinations thereof.

Without wishing to be bound by theory, the present inventors believe that the shape of the edible pet chews disclosed herein enhance the cleaning of pet teeth and enable the cleaning of back teeth not normally reached by known edible chews. In particular, the shape provides edges lacking in known pet chews and increased surface area relative to known pet chews, to thereby facilitate advantageous cleaning. The soft chewy texture of the edible pet chews disclosed herein avoids or significantly reduces gum bleeding which is caused by known dental treats with typically have a hard texture.

In another aspect of the present disclosure, a method of making an edible pet chew is provided. The method can comprise using a dry mix comprising a pre-gelled cereal flour. Optionally the dry mix can include other components in addition to the pre-gelled cereal flour, such as one or more of a protein source, a grain, a grain by-product, a vitamin, a mineral, a preservative, an antioxidant, a colorant, a palatant, or a flavorant.

Non-limiting examples of suitable vitamins include vitamin A, any of the B vitamins, vitamin C, vitamin D, vitamin E, and vitamin K, including various salts, esters, or other derivatives of the foregoing. Non-limiting examples of suitable minerals include calcium, phosphorous, potassium, sodium, iron, chloride, boron, copper, zinc, magnesium, manganese, iodine, selenium, and the like. In a particularly preferred embodiment, tricalcium phosphate can be used as a calcium source and as a tartar control agent.

Non-limiting examples of suitable preservatives include potassium sorbate, sorbic acid, sodium methyl para-hydroxybenzoate, calcium propionate, propionic acid, tricalcium phosphate, and combinations thereof. Non-limiting examples of suitable antioxidants include butylated hydroxyanisole (BHA), butylated hydroxytoluene (BHT), vitamin E (tocopherols), and combinations thereof. The antioxidant can provide an aesthetic effect and influence the odor of the edible pet chew, particularly during extended shelf-life.

Non-limiting examples of suitable colorants include FD&C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. Non-limiting examples of suitable palatants and flavorants include yeast, tallow, rendered animal meals (e.g., poultry, beef, lamb, and pork), flavor extracts or blends (e.g., grilled beef), animal digests, and the like.

The dry mix can contain emulsifiers and stabilizers such as soy lecithin, mono- and di-glycerides, and the like. Meat flours can be added to the dry mix and would be a source of lipids. Chicken fat can be used to reduce stickiness if needed, although higher temperature may be required to achieve the same expansion relative to a composition lacking chicken fat. Some other protein sources might be used for substantiation of nutritional claims (e.g. meat meals, greaves meals, etc.), the addition level being appropriate not to prevent expansion.

The dry mix can contain gelatin and/or a gum. Non-limiting examples of suitable gums are gellan gum, xanthan gum, locust bean gum, pectin, carrageenan (e.g., kappa, iota and/or lambda), cellulose gum, gum Arabic and the like, and combinations thereof.

The dry mix can contain an oil. Non-limiting examples of suitable oils are soybean oil, corn oil, sunflower oil, high oleic sunflower oil, olive oil, canola oil, safflower oil, peanut oil, palm oil, cottonseed oil, coconut oil, almond oil, hazelnut oil, grapeseed oil, and combinations thereof.

A composition comprising the humectant can be added to the dry mix to form dough that is dynamically cooked in an extruder. The composition comprising the humectant is preferably added to the dry mix in the extruder. Water and/or an additional preservative may be included in the composition comprising the humectant.

In the extruder, the dough constituents can mix with each other while shear is imparted within the extruder barrel. The temperature increase at the exit end of the extruder can cause sudden and extensive formation of gas in the dough, resulting in expansion of the dough at both a microscopic and macroscopic level as bubbling gas attempts to escape the material. Preferably the dough reaches a temperature of 230-300° F. Preferably the heated and sheared dough is cooled to 190 to 250° F. after reaching the temperature of 230 to 300° F., for example within the extruder or subsequent to exiting the extruder.

The extruder preferably has a die comprising an opening configured to impart the star polygon shape to the extrudate to form the edible chew. For example, the opening can have a star polygon shape. For an embodiment of the edible chew in which the shape is a pentagram, the opening may be formed by ten surfaces that are substantially equilateral and substantially equiangular relative to each other.

In yet another aspect of the present disclosure, a method of cleaning teeth of a pet is provided. The method comprises administering to the pet any of the embodiments of the edible chew disclosed herein.

EXAMPLES

By way of example and not limitation, the following examples are illustrative of embodiments of edible chews provided by the present disclosure.

Example 1

A 1,000 lbs. batch of dry mix basal was weighed out according to the percentages shown in Table 1 into a grinder for grinding and a batch mixer for mixing. The Dry Mix was metered into a standard pet food single screw extruder along with the glycerin/phosphoric acid mixture and water in the proportions shown in Table 1. The Dry Mix feed rate was in the range of 10-16 lbs./min. The Dry Mix and liquids were mixed, sheared through the extruder and achieved a temperature of 230-300° F. at the extruder exit. Then the cooked dough was pumped to a compactor in which the dough was allowed to cool down to 190-250° F. The plastic dough was then extruded through a five-prong star shape opening die located at the end of the compactor and cut into 5-inch long pieces.

TABLE 1

| | Ingredients | Amount (%) |
|---|---|---|
| DRY MIX | Pre-gelled Rice Flour | 57.14 |
| | Brewer's Rice | 30.0 |
| | Gelatin | 4.00 |
| | Kappa Carrageenan | 1.00 |
| | Distilled Monoglycerides | 1.75 |
| | BHA/BHT | 0.02 |
| | Dried Yeast | 1.26 |
| | Chicken By-Product Meal | 2.00 |
| | Tricalcium Phosphate | 1.10 |
| | Calcium Propionate | 0.32 |
| | Sorbic Acid | 0.71 |
| | Cottonseed Oil | 0.70 |
| | TOTAL | 100 |
| EXTRUSION | Dry Mix | 66.9 |
| | Glycerin/Phosphoric Acid (95:5) | 12.64 |
| | Water | 20.67 |
| | TOTAL | 100 |

The product moisture was 19.8% after the product was cooled down to ambient temperature. Table 2 shows the moisture analysis results of dental chew (Test A) vs. a Commercial Dental Chew (CDC). Higher moisture can reduce the product cost and result in a more affordable dental chew product.

TABLE 2

| Product | Moisture (%) |
|---|---|
| Test A | 19.8 |
| Commercial Dental Chew (CDC) | 12.6 |

Example 2

A texture profile analysis (TPA) was conducted to evaluate the texture of both dental chew (Test A) and the CDC. TPA was performed by an Instron 5500R Texture Analyzer. A T-shaped metal probe was selected to conduct the compression. A mean maximum load (same as break force) was recorded for each chew piece. 5 pieces each of chews for Test A and CDC were tested. Then the average of the mean maximum load/break force (lbf) for the 5 pieces of Test A and CDC was determined and shown in Table 3. Although the dental chew (Test A) has higher moisture than CDC, the break force (hardness) results are comparable.

TABLE 3

| Product | Mean MAX. Load/Break Force (lbf) |
|---|---|
| Test A | 68.073 |
| Commercial Dental Chew (CDC) | 68.611 |

Example 3

A group of 20 dogs were offered dental chew (Test A) and CDC at different times. Dog chewing time for individual treat was recorded. Average chewing time was calculated as the average chewing time of 20 dogs for each product and was recorded and shown in Table 4. It can be seen that Test A has similar chewing time as the CDC.

TABLE 4

| Product | AVG Product Piece Weight (g) | AVG Chewing Time (sec) | AVG Chewing Time/Product Weight (sec/g) |
|---|---|---|---|
| Test A | 25.8 | 72 | 2.8 |
| Commercial Dental Chew (CDC) | 28.5 | 73 | 2.6 |

Example 4

A dental efficacy test was carried out with the dental chew Test A (Example 1) at an animal facility. The following test protocol was employed: 60 medium dogs were selected (good health and have none of the considered teeth missing) for the test. After initial teeth cleaning and polishing, a pre-test phase of 7 days was conducted before the dental test period. During the pre-test phase, the dogs were fed the control diet (a mixture of wet and dry diets). At the end of the pre-test phase the 60 dogs were then divided into two groups—a control (CTRL Group) and a Test (Dental Chew Group). The grouping was done by stratifying the animals according to their dental scores at the end of the pre-test phase. This method was used to reduce the variability between the groups. Followed by teeth cleaning and polishing, in the 28-day dental test phase, CTRL Group received the same control diet as in the pre-test phase while Dental Chew Group received the same type of control diet plus one piece of dental chew (Test A) per day. After the 28-day dental test phase, gingival index, plaque, and tartar development scoring were done on considered teeth. Statistical analyses were carried out on both sets of data, and the results are shown in Table 5.

TABLE 5

| Dental Score | CTRL Group | Dental Chew Group | % Reduction |
|---|---|---|---|
| Calculus Score | 1.443 | 0.9897 | 31 |
| Gingivitis Score | 0.117 | 0.0862 | 26 |
| Plaque Score | 6.053 | 5.7241 | 5.4 |

Table 5 illustrates that Dental Chew Group had better dental cleaning scores than CTRL Group, therefore the dental chew (Test A) is a dental treat with improved dental efficacy. Further statistical analysis of the calculus scores of eight teeth (four premolars, P4; and four molars, M1) located at the back of the mouth is shown in Table 6. It is clear that there is a higher calculus reduction compared to the overall mouth calculus data shown in Table 5. Therefore, the dental chew (Test A) is effective in cleaning hard-to-reach areas in a dogs' mouth.

TABLE 6

| Calculus Score for | CTRL Group | Treat Group | % Reduction |
|---|---|---|---|
| P4 | 2.6417 | 1.4914 | 44 |
| M1 | 1.3333 | 0.7586 | 43 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An edible pet chew comprising an expanded pre-gelled cereal flour that is 30 wt. % to 60 wt. % of the edible pet chew, the edible pet chew further comprising a humectant that is 10 wt. % to 17% of the edible pet chew, the edible pet chew having a moisture content of 18 wt. % to 24 wt. % and having a transversal cross section that has a star polygon shape,
   wherein the edible pet chew further comprises an additional ingredient selected from the group consisting of a grain, a grain by-product, a vitamin, a mineral, a preservative, an antioxidant, a colorant, a flavorant, gelatin, a gum, an emulsifier, an oil, and mixtures thereof,
   an entirety of the protein in the edible pet chew is provided by the cereal flour and any protein in the additional ingredient,
   wherein the edible pet chew is a single unitary piece that is substantially homogenous,
   the edible pet chew comprises a first end that has the star polygon shape, a second end that has the star polygon shape, and a length defined by the distance between the first end and the second end, wherein the transversal cross section is perpendicular to the length, and the first end has a continuous uninterrupted surface over an entirety of the area within the star polygon shape on the transversal cross section of the first end.

2. The edible pet chew of claim 1 wherein the continuous uninterrupted surface over the entirety of the area within the star polygon shape on the transversal cross section of the first end is substantially planar.

3. The edible pet chew of claim 1 wherein the star polygon shape of the continuous uninterrupted surface at the first end is a pentagram shape.

4. The edible pet chew of claim 1, wherein the edible pet chew has the star polygon shape along substantially the entirety of the length of the chew.

5. The edible pet chew of claim 1, wherein the length is two to ten inches.

6. The edible pet chew of claim 1 wherein the star polygon shape of the transversal cross section is a pentagram shape.

7. The edible pet chew of claim 1 wherein the humectant is a polyol.

8. The edible pet chew of claim 1, which is an extruded product.

9. The edible pet chew of claim 1 wherein the emulsifier is selected from the group consisting of soy lecithin, monoglycerides, diglycerides, and mixtures thereof.

10. The edible pet chew of claim 1 wherein the preservative is selected from the group consisting of potassium sorbate, sorbic acid, sodium methyl para-hydroxybenzoate, tricalcium phosphate, calcium propionate, propionic acid, and mixtures thereof.

11. The edible pet chew of claim 1 wherein the antioxidant is selected from the group consisting of butylated hydroxyanisole (BHA), butylated hydroxytoluene (BHT), vitamin E, and mixtures thereof.

12. The edible pet chew of claim 1 wherein the flavorant is selected from the group consisting of yeast, tallow, an animal meal, an animal digest and mixtures thereof.

13. The edible pet chew of claim 1 wherein the colorant is selected from the group consisting of FD&C colors, roasted malt flour, caramel coloring, annatto, chlorophyllin, cochineal, betanin, turmeric, saffron, paprika, lycopene, elderberry juice, pandan, butterfly pea, titanium dioxide, and mixtures thereof.

14. The edible pet chew of claim 1 wherein the gum is selected from the group consisting of gellan gum, xanthan gum, locust bean gum, pectin, kappa carrageenan, iota carrageenan, lambda carrageenan, cellulose gum, gum Arabic and mixtures thereof.

15. The edible pet chew of claim 1 wherein the oil is selected from the group consisting of soybean oil, corn oil, sunflower oil, high oleic sunflower oil, olive oil, canola oil, safflower oil, peanut oil, palm oil, cottonseed oil, coconut oil, almond oil, hazelnut oil, grapeseed oil, and mixtures thereof.

16. The edible pet chew of claim 1 wherein the additional ingredient comprises animal meal in an amount up to 2 wt. % of the edible chew.

17. The edible pet chew of claim 1 consisting of the expanded pre-gelled cereal flour, the humectant, the moisture content and the additional ingredient.

18. The edible pet chew of claim 1, wherein the star polygon shape is a pentagram.

* * * * *